United States Patent [19]

Crankshaw

[11] 4,275,805
[45] Jun. 30, 1981

[54] OVERRUNNING CLUTCH

[76] Inventor: John H. Crankshaw, 439 Shawnee Dr., Erie, Pa. 16505

[21] Appl. No.: 912,746

[22] Filed: Jun. 5, 1978

[51] Int. Cl.³ .................... F16D 11/00; F16D 41/08
[52] U.S. Cl. ........................................ 192/46; 192/35; 192/45
[58] Field of Search ............... 192/46, 47, 45, 45.1, 192/41 R, 35, 36

[56] References Cited

U.S. PATENT DOCUMENTS

| 1,817,660 | 8/1931 | Winther et al. | 192/46 X |
| 2,232,090 | 2/1941 | Anderson | 192/45 |
| 2,308,926 | 1/1943 | Kreis | 192/46 |
| 2,323,353 | 7/1943 | Plog | 192/46 |
| 4,126,214 | 11/1978 | Kiss | 192/36 |

Primary Examiner—Rodney H. Bonck

[57] ABSTRACT

An overrunning clutch made up of an input member and an output member with locking means between them for positively locking the two members together and a racheting member on the input for moving the locking member from a position to positively lock the input member to the output member when the input member rotates at a higher speed than the output. The clutch has an improved mechanism for engagement of the drive and driven parts.

11 Claims, 13 Drawing Figures

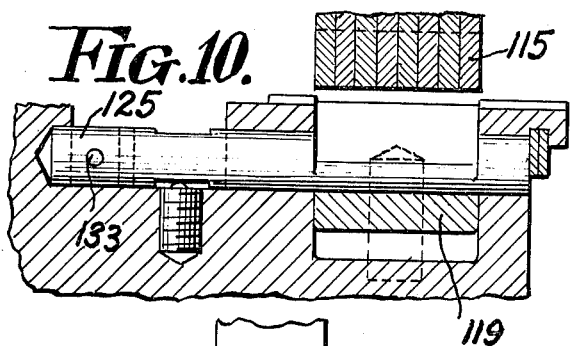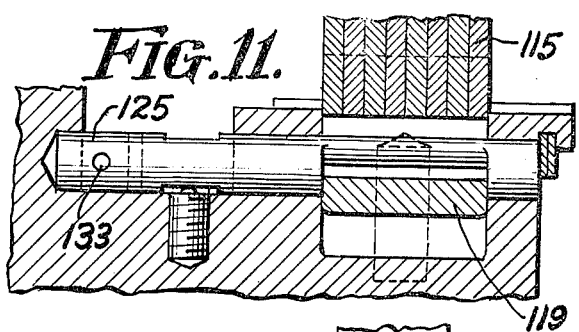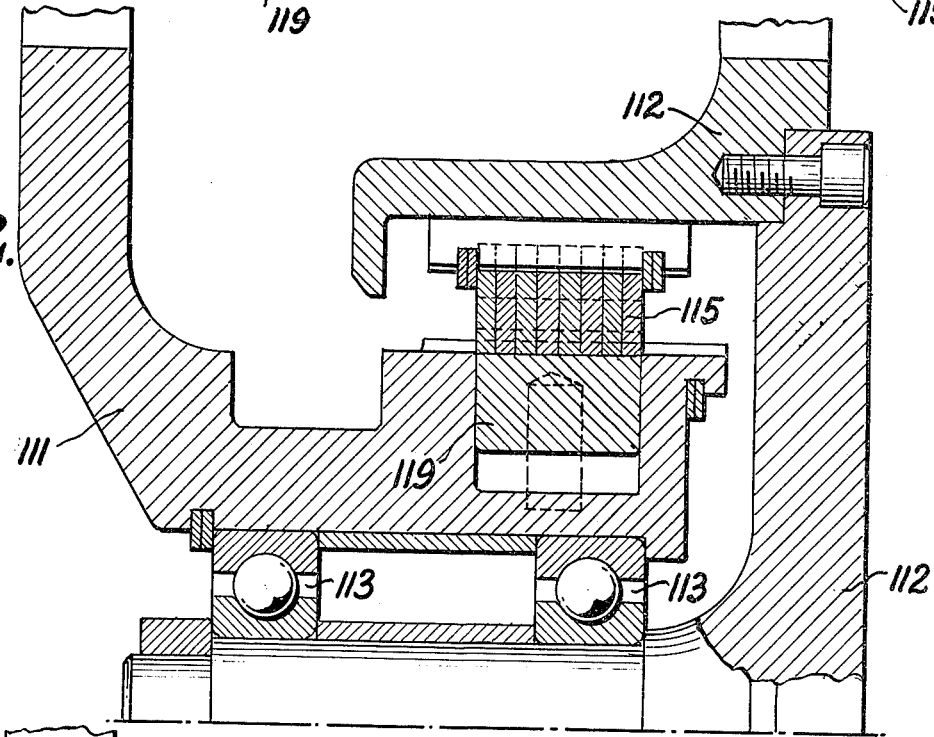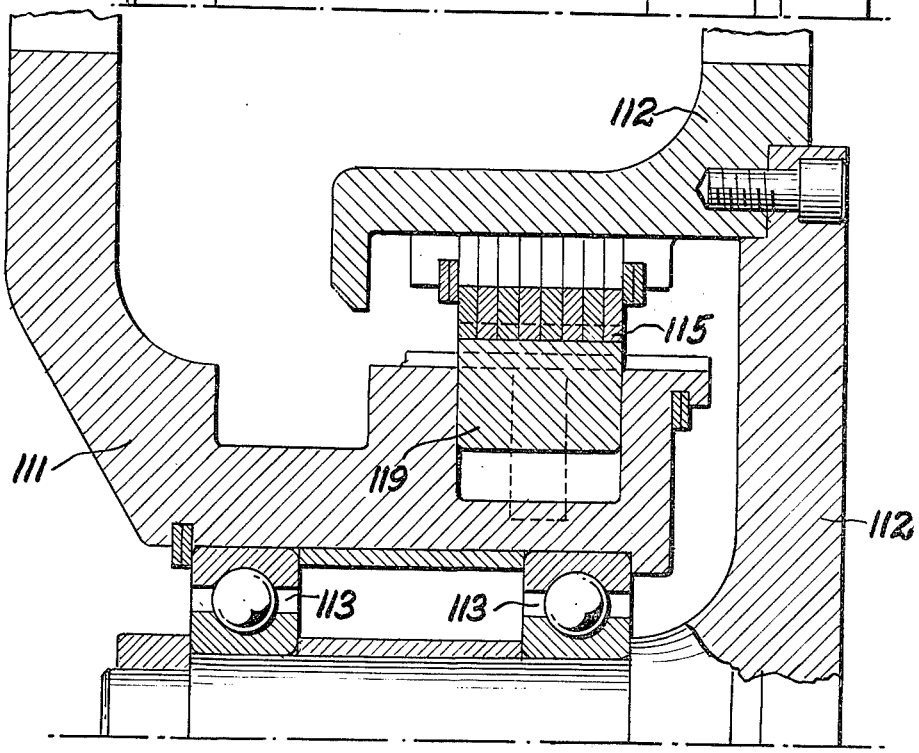

4,275,805

OVERRUNNING CLUTCH

GENERAL DESCRIPTION OF THE INVENTION

Overrunning clutches depending on friction may destroy themselves if they slip, and have inherent limitations in torque capacity and overrunning speed. Positive drive clutches are superior in these categories, but of necessity are relatively large and expensive.

Two alternative design ideas are described in this application. Both are of the positive drive concept, have unlimited overrunning speed capacity, and can be produced as a clutch assembly to be used alone if no shaft misalignment is involved, or in conjunction with a standard gear type coupling at the user's option. Both have another important feature in that they always engage with both input and output shafts in the same circumferential orientation. This helps in establishing and maintaining shaft system dynamic balance.

REFERENCE TO PRIOR ART

The clutch disclosed herein constitutes an improvement over the clutches shown in the following U.S. Pat. Nos: 1,798,918, 2,308,926, 2,323,353, 3,249,187, 3,463,280, 3,468,403, 3,554,339.

OBJECTS OF THE INVENTION

It is an object of the invention to provide an improved overrunning clutch.

Another object of the invention is to provide an overrunning clutch that will positively lock when driven in a first direction, but will free-wheel when driven in a second direction.

Another object of the invention is to provide an overrunning clutch that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 10 is a longitudinal, cross-sectional view taken on Line 10—10 of FIG. 9.

FIG. 11 is a view taken on Line 11—11 of FIG. 8.

FIG. 12 is a longitudinal, cross-sectional view of a part of the second embodiment of the coupling.

FIG. 13 is a view similar to FIG. 12 showing the coupling in engaged position.

DETAILED DESCRIPTION OF THE DRAWINGS

Figure 1:
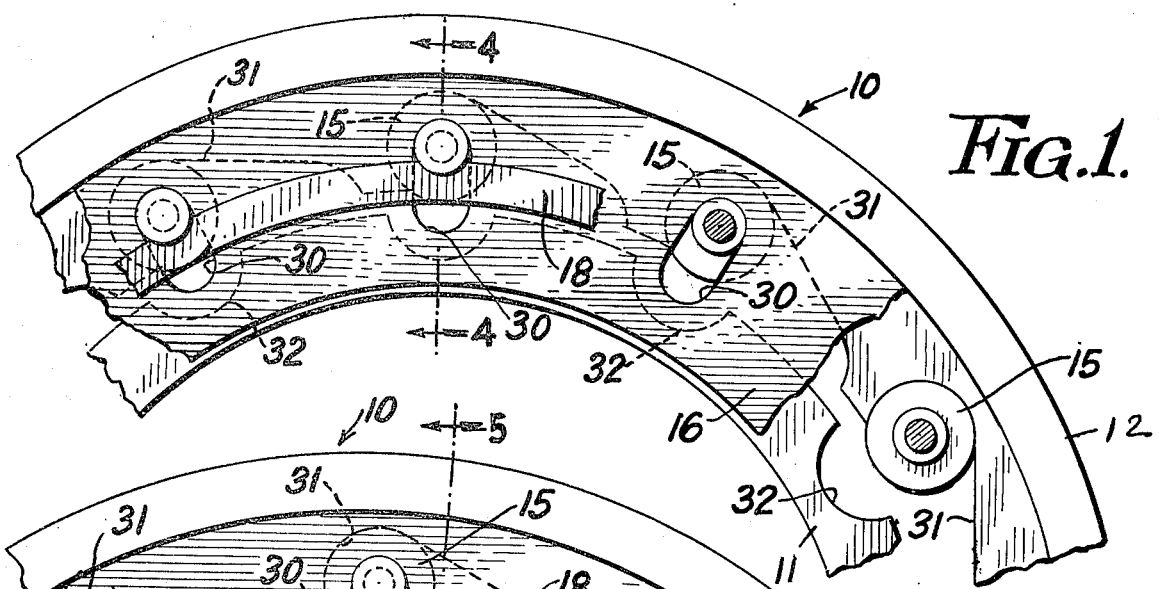
FIG. 1 is a partial end view of one embodiment of the clutch with parts broken away showing the essential elements of one embodiment of the clutch in disconnected position.

Now, with more particular reference to the drawings, the overrunning clutch 10 shown in the embodiment of the drawings of FIGS. 1-6 has the drive member 11 and the driven member 12 referred to as input member and output member. The input member has a hub which is received in the hollow output member 12 and bearings 13 rotatably support the input member or the output member relative rotation when the clutch is free wheeling. The member 11 could be used as input and member 12 as output.

The output hub 12 has the series of pockets 14 which contain a roller 15 whose ends project through the radially-directed elongated holes 30 in the guide plates 16. The rollers are normally pushed outward by the resilient retaining rings 18 which engage the ends of the rollers. The annular guide plates 16 are rotatably supported on the inside of the drive member and the retaining rings 18 engage the outer end of rollers 15 urging them outwardly. The pawls 19 are supported in bores in the drive member and springs 21 urge the pawls radially-outwardly into engagement with the inner periphery of guide plates 16. Each of the guide plates 16 has a single notch 28 in its inner periphery and when the input member 11 rotates in a clockwise direction when facing FIG. 2, the point 29 on the pawl 19 engages notch 28 rotating the guide plates along with the input member 11. Since the ends of the rollers 16 extend outward through the slots 30, the rollers are carried along with the input member. Since the outer periphery of the rollers are in engagement with the cam surfaces 31 on the driven member, the rollers are moved inwardly into the notches 32 on the output member.

To facilitate testing, the clutch pawl stops 25 are provided. The pawl stops 25 are in the form of elongated members which are rotatably received in the input member 11. The pawl stops 25 each have a hole 33 into which a pin can be inserted to act as a handle to rotate the stop, thereby bringing the cam to the position shown in FIG. 2, holding the pawl 19 out of engagement with the guide plate 16 so that the detent 19 cannot engage the notch 28 and; therefore, rotate the guide plates to engage the clutch.

OPERATIONS—SHAFT AT REST

With the clutch at rest, the rollers 15 are pushed to the outward ends of their respective pocket 14 by the retaining rings 18. The pawls 19 are pushed outwardly by the springs 21 and contact the inner surface of the guide plate 16. If input flanges are rotated clockwise viewed from the left as the pawls 19 reach and engage the notches 28 in respective guidepoints, the guideplates are rotated clockwise taking the rollers along with them. As the rollers are displaced clockwise with the respective stationary hub, they are cammed inward by the tangentially extending surfaces 31 moving them radially inwardly in the elongated holes in the guide plates.

Figure 3:
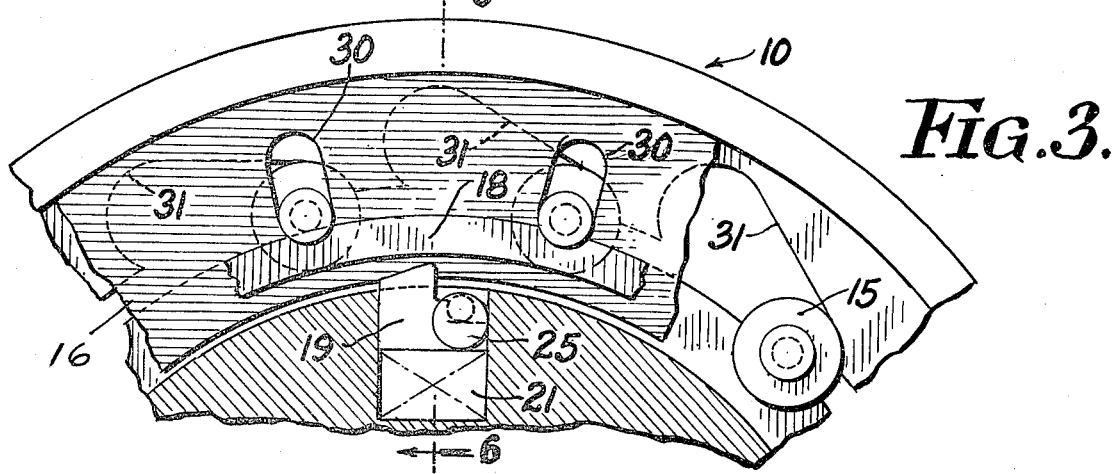
FIG. 3 is a partial view of the clutch similar to FIG. 1 with the parts engaged.
Figure 5:
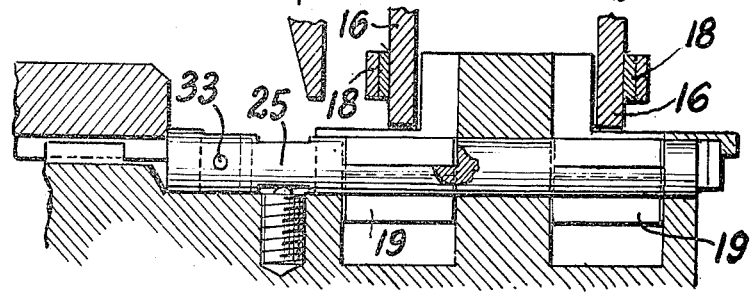
FIG. 5 is a cross-sectional view taken on Line 5—5 of FIG. 2.
Figure 4:
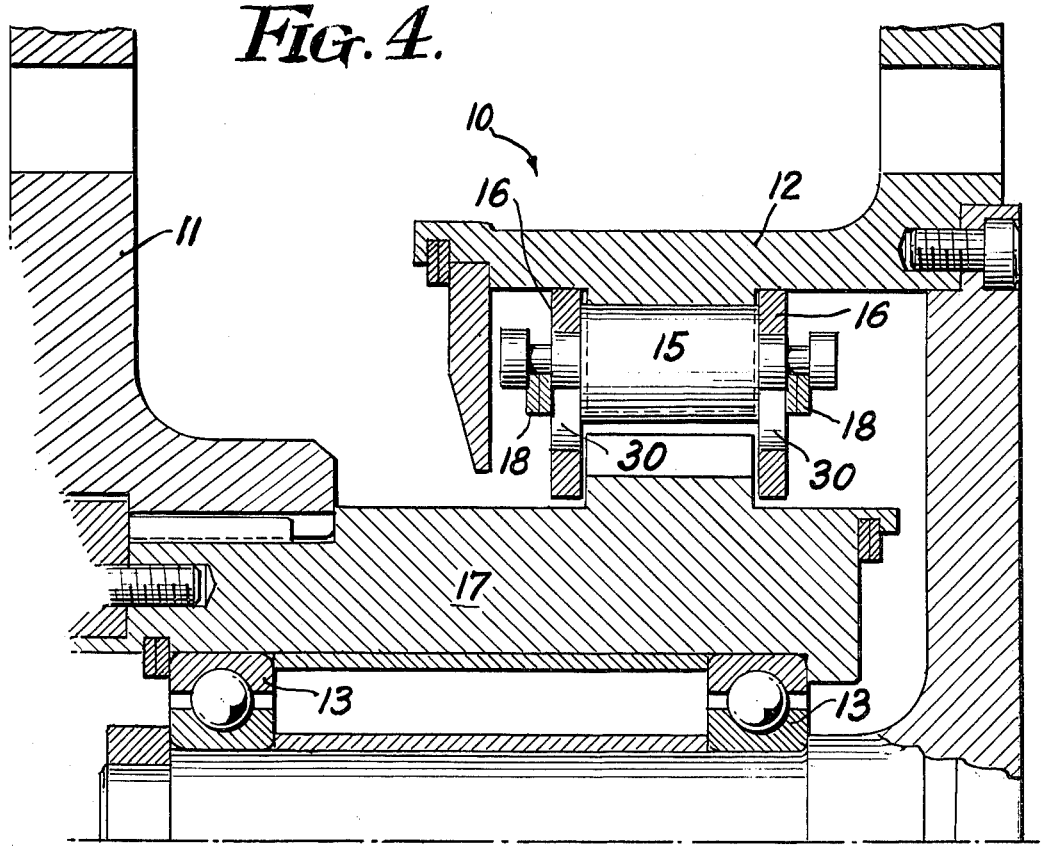
FIG. 4 is a longitudinal cross-sectional view of the clutch taken on Line 4—4 of FIG. 1.
Figure 6:
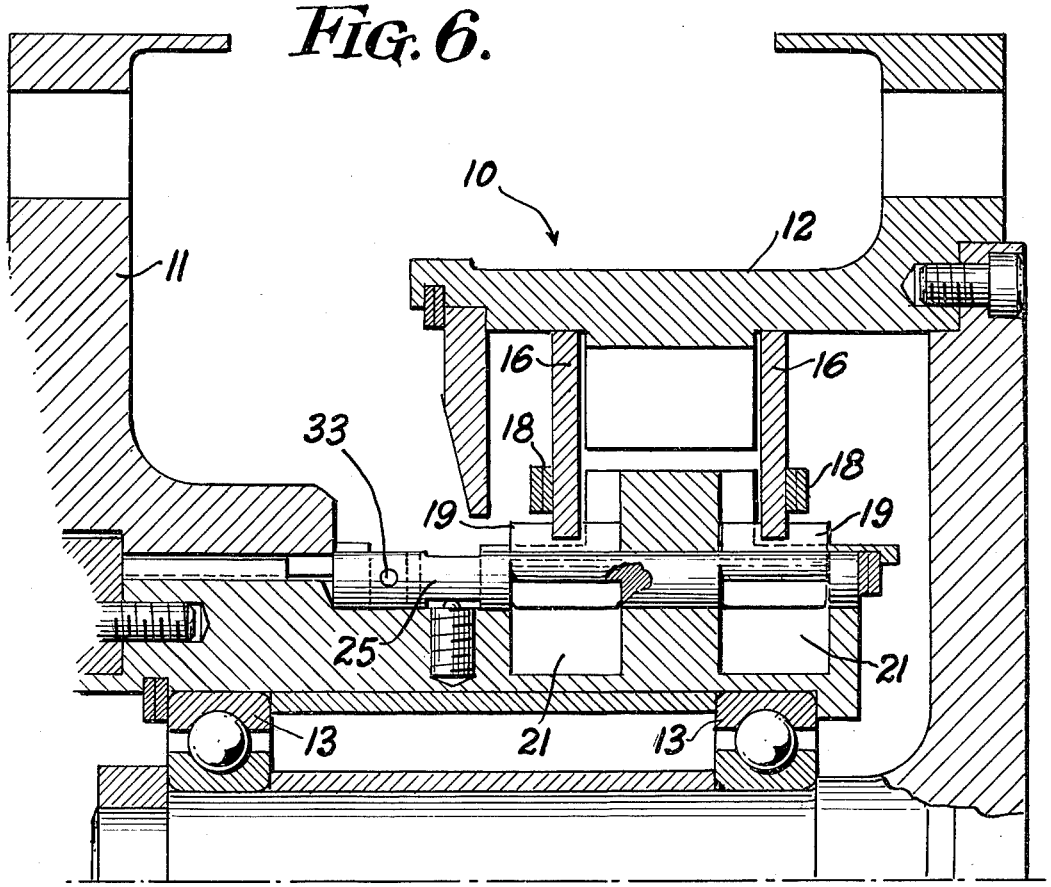
FIG. 6 is a cross-sectional view taken on Line 6—6 of FIG. 3.
Figure 7:
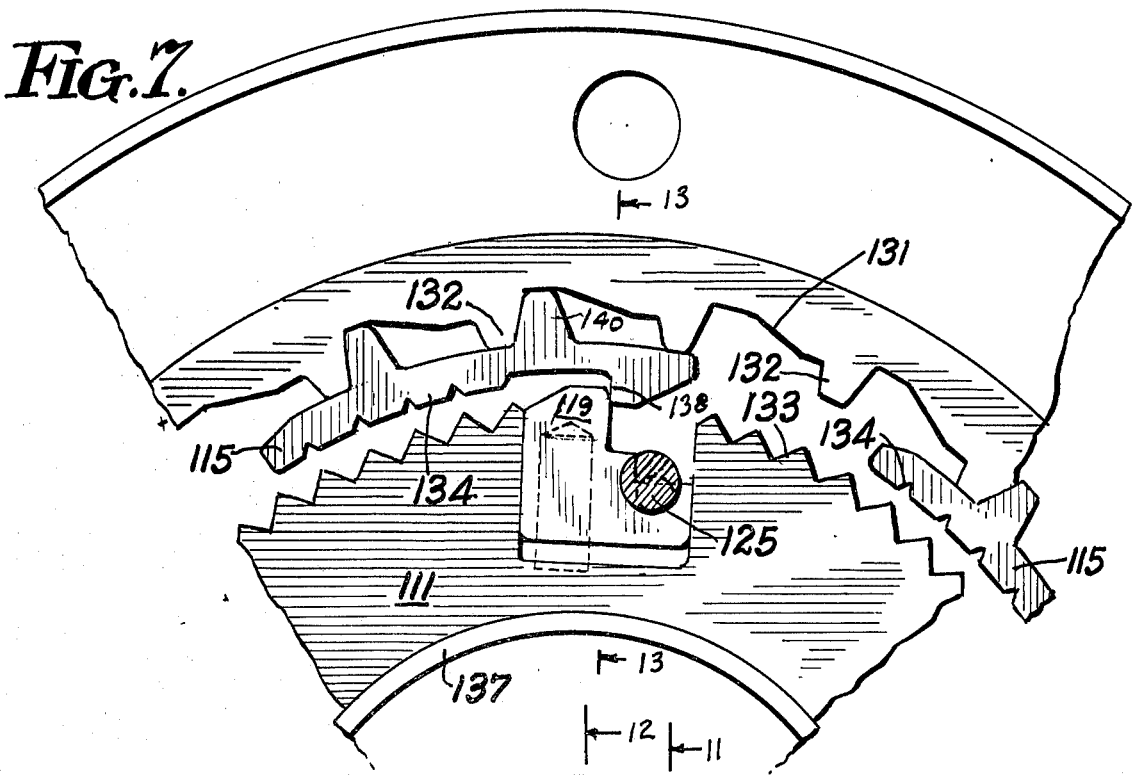
FIG. 7 is a view similar to FIG. 1 of another embodiment of the invention in disengaged position.
Figure 8:
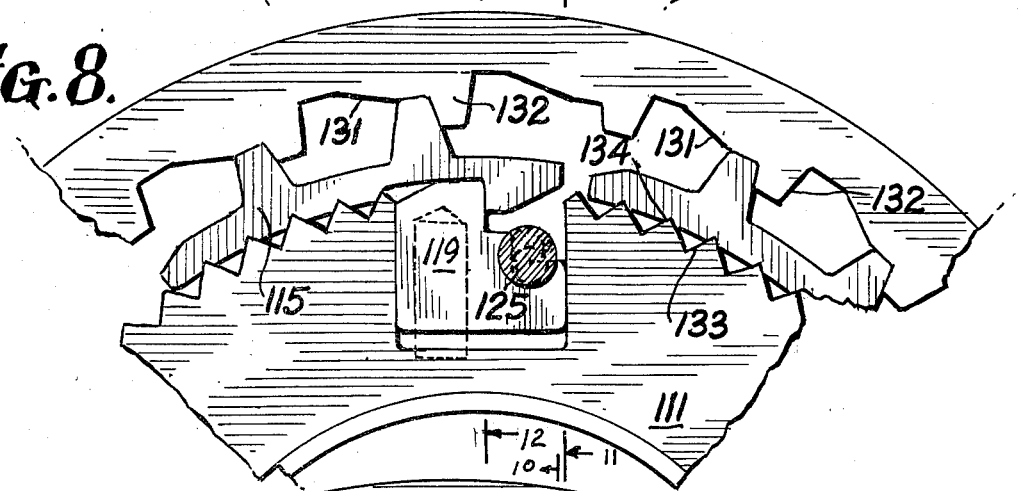
FIG. 8 is a view of the second embodiment of the invention similar to FIG. 2 showing the coupling in engaged position.

Moving inwardly, the rollers enter the grooves 32 in the outside surface of the input hub and seat themselves in the position shown in FIG. 3 in the engaged position. Torque is now transmitted from the input hub 11 to the output hub 12 through the compression and shear of the rollers 15 and the seating surface in each hole.

Rotating the input hub counterclockwise allows the rollers to move outwardly on the cam surfaces 31 under the pressure of the retaining rings 18 until the parts return to their initial position and the clutch is disengaged.

OUTPUT SHAFT ROTATING

Assuming that the output hub 12 is rotating and the input hub 11 at rest or running at a slower speed, the centrifical force on the rollers add to the pressure of the retaining rings 18 keeping them outward and disengaged. Similar forces act on the pawl 19, but since relative rotation is counterclockwise, they skip over the notches in the guideplates without engagement.

If now the speed of the input hub increases, then at the instant it exceeds the output speed, the pawls 19 engage the notches 28 in the guideplates and the clutch engages as described above. If input speed drops below that of the output speed, the clutch automatically disengages as described above.

LOCK OUT FEATURE

In the above paragraphs, it has been assumed that the pawl stop 25 has been in the normal position shown in FIG. 3 allowing the pawl to engage the notches 28.

It may be desirable to prevent clutch engagement under certain conditions, for instance, when setting over speed trips on a prime mover connected to input shaft.

Figure 2:
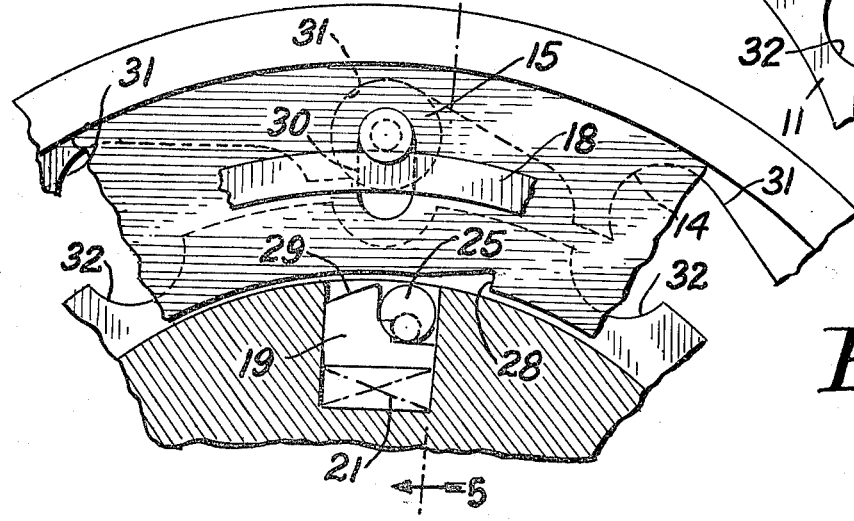
FIG. 2 is a partial view of the clutch of FIG. 1 showing the parts locked in disconnected position as for testing.

By inserting a pin in the hole 33 and rotating the pawl stop 25 180° as viewed from the input end, the pawls are retracted as shown in FIG. 2. This prevents contact between the pawl 19 and the notches 28 in the guide plates and the clutch cannot engage regardless of direction or speed of rotation.

Now, with reference to the embodiment of the invention shown in FIGS. 7-12, FIG. 7 shows the clutch 110 in disengaged position and FIG. 12 shows it in engaged position.

The input hub 111 is supported on bearings 113 for free rotation on the output member and the bore of the output hub is equipped with a series of gear teeth 132, between each pair of which is a cam surface 131 with a flat at each end. The outside surface of the main body of the input member 111 is serrated with teeth 133.

The clutch rings 115 are supported between the sets of teeth 133 on the input hub and teeth 132 on the output hub. The clutch rings are in the form of discs. The free diameters of these rings 115 are slightly larger than the roots of the output hub teeth 132. The rings 115 are held in a compressed fixture when the teeth are cut during manufacture so that the tooth profiles and spacing are accurate for the engaged positions.

Input hub 111 has a cylindrical radial hole in which it is installed a pawl 119. The outermost travel of the pawl is controlled by the position of the transfer pawl stop 125. The mid-section of the pawl stop 119 is off-step or eccentric to its ends so that in the position shown in FIG. 11, the pawl is free to project outward to engage the notches at the end of the clutch rings. By inserting a pin in the hole at the left hand end of the pawl stop, it may be turned to retract the pawl, preventing engagement between the pawl and the clutch rings 115.

OPERATION SHAFT AT REST

Figure 9:
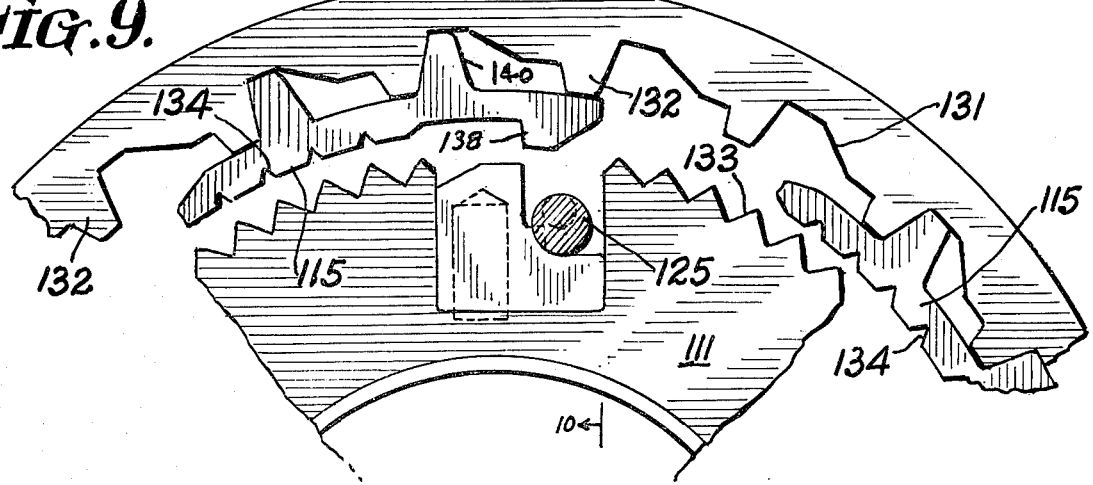
FIG. 9 is a view similar to FIG. 7 showing a second embodiment of the clutch locked in disconnected position as for testing.

With the clutch at rest, the clutch rings 115 are free to spring outward to the position shown in FIG. 9 with the inner serrations disengaged. If now the inner hub is rotated clockwise, the pawl 119 engages the shoulder 138 on the end of the rings 115 and begin to rotate the rings in the bore of the output hub 112. The outer teeth 140 on the clutch rings travel down the ramps 131 on the output member and serrations 134 finally engage with the tips of the input member teeth 133 on the input member 111. Torque is now transmitted from the input member through the rings 115 to the output member.

Rotating the input hub counterclockwise from this position releases the pawl from the ring notches and the clutch rings expand to allow the outer teeth to slide outward to the cam ramps thereby disengaging the ring from the input member to return the part to their initial position and allow the clutch to overrun.

Assuming that the output shaft is rotating with the input shaft at rest or running at a slower speed, both the outward natural spring of the clutch rings 115 and the centrifical force acting on them keep the clutch disengaged. The spring force and a centrifical force on the pawl 119 act to keep it riding the inner surface of the clutch rings, but since relative rotation is counterclockwise, the pawl skips over the ring notches without engagement and the clutch overruns.

If now the speed of the input hub is increased, at the instant that the pawl 119 overtakes the output hub, the pawl engages the shoulder 138 in the clutch rings 115 and the clutch engages as described.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A clutch (10) having a drive member (11) and a driven member (12), cam surfaces (31) defining pockets in the said driven member (12), detent means (15), said detent means (15) being adapted to be received in said pockets, resilient means (18,115) supported by said detent means (15) and urging said detent means (15) into said pockets when said drive member (11) rotates relative to said driven member (12) in a first direction, ring means (16), said ring means (16) having an inwardly directed notch (28) thereon, pawl means (19) supported on said drive member (11) and radially movable relative thereto adapted to engage a side of said notch (28) on said ring means (16) when said drive member (11) rotates relative to said driven member (12) in the first direction, radially extending slots (30) in said ring means receive the ends of said detent means, said pawl means (19) engaging said notch once the drive member rotates in a second direction relative to said driven member (12) whereby said ring means moves said detent means along cam surfaces (31) moving said detent means (15) into engagement with said drive member (11), whereby said drive member (11) and/or driven member (12) are positively connected together.

2. The clutch recited in claim 1 wherein said detent means (15, 140) comprises,
rollers (15),
said rollers (15) engage U-shaped recesses (32) in said drive member (11) when moved towards said drive member by said cam surfaces (31, 131) on said driven member (12).

3. The clutch recited in claim 2 wherein said resilient means comprises a resilient (18) ring engaging said rollers urging said rollers into said pockets in said driven member, wherein said drive member rotates relative to said driven member in a first direction.

4. The clutch recited in claim 1 wherein a ring is supported on said clutch,
said detent means (115) are fixed to said ring and said ring is resilient comprising said resilient means.

5. The clutch recited in claim 2 wherein said ring means comprises two rings receiving said rollers therebetween.

6. The clutch recited in claim 1 wherein said ring means comprises two spaced guide plates receiving said rollers therebetween,
said guide plates having radially extending slots receiving means on said rollers guiding said rollers radially outwardly and inwardly onto said clutch.

7. The clutch recited in any of claims 1 through 6 wherein said pawl means is disposed in a radially extending opening in said driven member.

8. The clutch recited in any of claims 1, 2, 3, 4 or 6 wherein spring means is provided urging said pawl means outwardly towards said ring means when said pawl means engages said notch means in said ring means when said drive member rotates relative to said driven member.

9. The clutch recited in any of claims 1, 2, 4 or 6 wherein said pawl means has a shoulder and a cam member is disposed on said drive member and rotated into engagement with said pawl means for holding said pawl means in engagement with said ring means.

10. The clutch recited in claim 6 wherein said guide plates have said notch on the inner surface thereof and said pawl means is supported in said drive member for engaging said notch in said plates when said drive member is rotated to a first direction around said driven member.

11. A clutch comprising a driven member disposed around a drive member,
said drive member having outwardly extending teeth on the outer periphery thereof,
said driven member having inwardly extending teeth,
circumferentially spaced pockets on the inside surface of said driven member,
a resilient ring disposed between said drive member and said driven member,
said ring having spaced notches adapted to engage said teeth on said drive member and having detent members on the outer periphery of said resilient ring,
said detent members being adapted to be received in said pockets in said driven member,
cam surfaces on said driven member for urging said detent members towards said drive member whereby said ring is forced towards said drive member forcing said teeth on said drive member into engagement with said notches on said ring, a pawl member carried by said drive member and radially movable relative thereto,
means on said ring for engaging said pawl members when said drive member is rotated in a first direction relative to said driven member.

* * * * *